United States Patent
Steffes

[19]

[11] Patent Number: 5,924,775
[45] Date of Patent: Jul. 20, 1999

[54] ANTISKID HYDRAULIC BRAKING SYSTEM

[75] Inventor: Helmut Steffes, Hattersheim, Germany

[73] Assignee: ITT Manufacturing Enterprises, Inc., Wilmington, Del.

[21] Appl. No.: 08/860,057

[22] PCT Filed: Dec. 12, 1995

[86] PCT No.: PCT/EP95/04900

§ 371 Date: Sep. 11, 1997

§ 102(e) Date: Sep. 11, 1997

[87] PCT Pub. No.: WO96/19369

PCT Pub. Date: Jun. 27, 1996

[30] Foreign Application Priority Data

Dec. 22, 1994 [DE] Germany ............................ 44 45 860

[51] Int. Cl.$^6$ ........................................................ A60T 8/40
[52] U.S. Cl. ................................. 303/116.2; 303/116.1; 303/10
[58] Field of Search ................................ 303/10, 115.4, 303/116.1, 116.2

[56] References Cited

U.S. PATENT DOCUMENTS

| 5,342,120 | 8/1994 | Zimmer et al. | 303/116.2 |
| 5,605,385 | 2/1997 | Zaviska et al. | 303/116.2 |

FOREIGN PATENT DOCUMENTS

| 3034628 | 4/1982 | Germany . |
| 3148979 | 10/1982 | Germany . |
| 3538264 | 4/1987 | Germany . |
| 3818358 | 2/1989 | Germany . |
| 3800854 | 4/1989 | Germany . |
| 4020450 | 1/1992 | Germany . |
| 4138027 | 5/1993 | Germany . |
| 4213205 | 3/1994 | Germany . |
| WO91 18776 | 12/1991 | WIPO . |
| WO96 19369 | 6/1996 | WIPO . |

*Primary Examiner*—Lee W. Young
*Assistant Examiner*—Mariano Sy
*Attorney, Agent, or Firm*—Rader, Fishman & Grauer PLLC

[57] ABSTRACT

The invention is based on the objective of simplifying the filling of a auxiliary reservoir that provides an additional medium pressure volume for the suction side of a return pump. For this purpose, the invention proposes to utilize a separating piston that is charged on one side by the main cylinder pressure and on the other side by a compression spring. The pressure medium is conveyed from the main reservoir to the auxiliary reservoir by means of two return valves while the separating piston is displaced. Due to the stepped design of the separating piston, only a small volume displacement is required on the side of the main cylinder for supplying a large charge volume to the auxiliary reservoir.

5 Claims, 1 Drawing Sheet

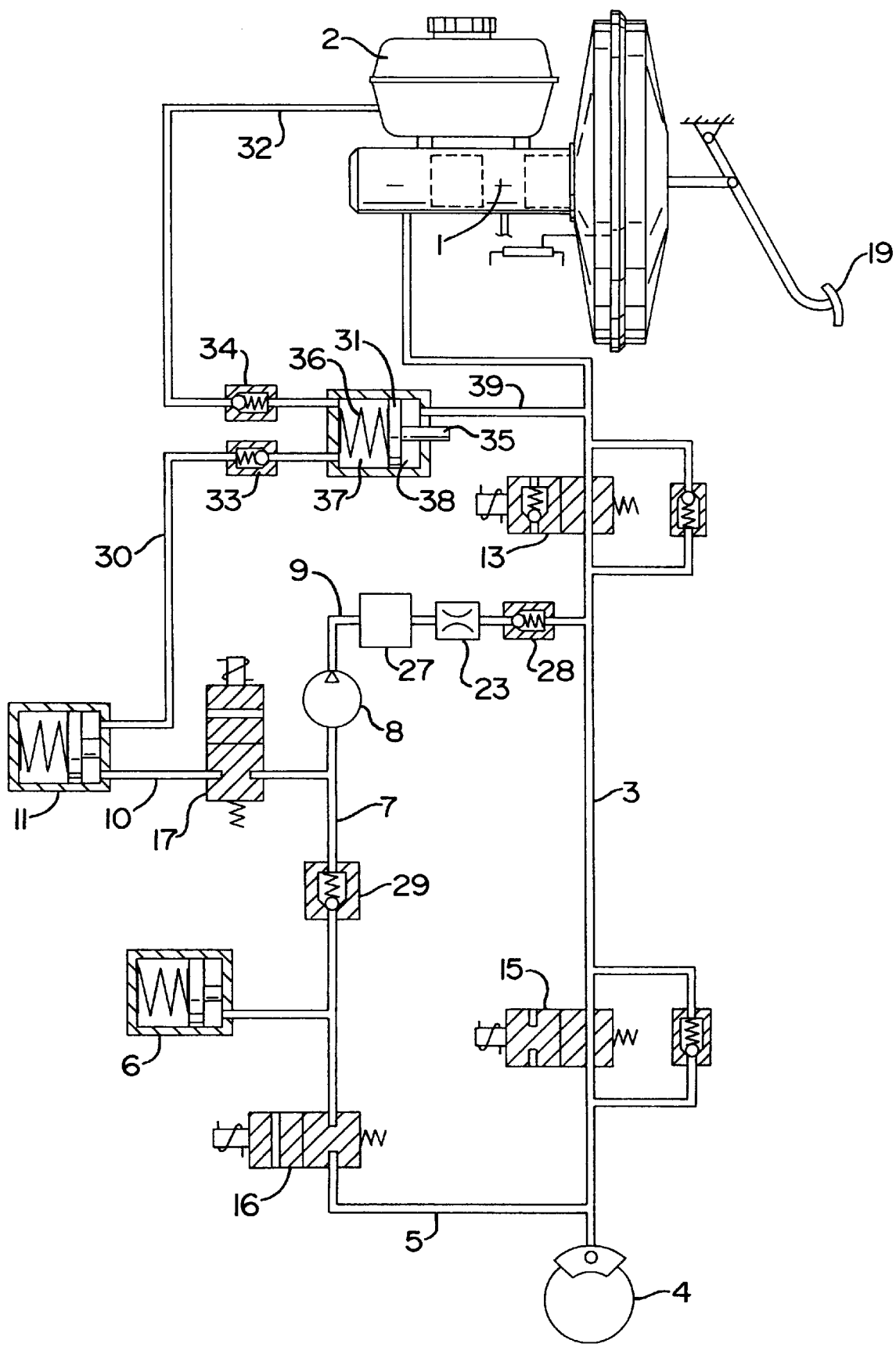

ANTISKID HYDRAULIC BRAKING SYSTEM

TECHNICAL FIELD

The present invention relates to vehicle brake systems and more particularly relates to hydraulic brake systems with slip control.

BACKGROUND OF THE INVENTION

A brake system of this type is, for example, known from WO 91/18776. The auxiliary reservoir of this known brake system merely serves for providing an additional volume for the slip control. Consequently, the on-off valve in the pump supply line should only open during the slip control. However, such an auxiliary reservoir is also practical if the brake pressure should be additionally built up by means of the pump when the brake pedal is actuated, e.g., for controlling driving stability.

The present invention is based on the objective of additionally improving a brake system of the initially mentioned type with respect to the charging of the auxiliary reservoir.

The present invention achieves this objective by filing the auxiliary reservoir by a separating piston that is displaced from the main brake cylinder toward the auxiliary reservoir. By using this approach, the return pump of an antilock brake system (without slip control) can be designed in nonregenerative fashion.

Due to the medium separation between the brake line and the auxiliary reservoir, the chamber of the separating piston which is connected to the auxiliary reservoir can be directly connected to the pressure medium reservoir without creating an open system. In this case, a return valve arrangement prevents the pressure medium from flowing from the auxiliary reservoir into the main reservoir.

Due to the fact that the separating piston is prestressed toward its first chamber, which is charged by the main cylinder pressure by means of a spring, the chamber on the side of the auxiliary reservoir is automatically refilled when the main cylinder is depressurized.

A stepped design of the separating piston provides an advantageous option for increasing or decreasing the volume between the main cylinder and the auxiliary reservoir. This means that only a small volume on the side of the main cylinder suffices for supplying a significantly larger volume to the auxiliary reservoir.

BRIEF DESCRIPTION OF THE DRAWING

FIG. 1 shows the hydraulic components of a brake system according to the invention, with only one of two brake circuits and only one wheel brake of said brake circuit being illustrated.

DETAILED DESCRIPTION OF THE PREFERRED EMBODIMENT

The main cylinder 1 is connected to the main reservoir 2. This main cylinder is also connected to the wheel brake 4 by way of the brake line 3. The return line 5 extends from the wheel brake 4 to the low-pressure reservoir 6. The suction side of the pump 8 is connected to the low-pressure reservoir 6 via the suction line 7. The pressure line 9 originates at the pressure side of the pump 8 and ends in the brake line 3. The suction side of the pump 8 is also connected to the auxiliary reservoir 11 via a pump supply line 10. An admission pressure return valve 29 is inserted into the suction line 7. This return valve prevents a negative pressure from building up in the low-pressure reservoir 6 if a regenerative pump 8 is used. The pump supply line 10 contains an on-off valve 17. A reservoir discharge line 30 that connects the auxiliary reservoir 11 with a separating piston 31 is provided for filling the auxiliary reservoir 11. A supply line 32 extends from the main reservoir 2 to the separating piston 31.

The inlet valve 15 is inserted into the brake line 3 between the point at which the pressure line 9 is connected to the brake line 3 and the wheel brake 4. The return line 5 is provided with an outlet valve 16.

The brake line 3 has a separating valve 13 between the main cylinder 1 and the point at which the pressure line 9 is connected to the brake line 3. The return line 5 is provided with an outlet valve 16.

The separating valve 13 and the inlet valve 15 are realized in the form of two 2-way solenoid valves that are open when without current. The outlet valve 16 and the on-off valve 17 are realized in the form of two 2-way solenoid valves that are closed when without current. The pressure line 9 of the pump 8 contains conventional noise muffling means, namely a muffling chamber 27, a throttle point 23 and a return valve 28 that opens from the pump 8 toward the brake line 3.

The separating piston 31 separates two chambers 37 and 38. The first chamber 37 is connected to the auxiliary reservoir 11, with the second chamber 38 connected to an actuating line 39 that leads to the brake line 3 between the main cylinder 1 and the separating valve 13. In order to ensure that the chamber 37 is automatically filled with the pressure medium situated in the main reservoir 2, the separating piston is prestressed by a compression spring 36 from this side. The respective return valves 33 and 34 arranged in the reservoir charge line 30 and the supply line 32 cause a medium pressure flow that is only able to pass from the main reservoir 2 to the chamber 37 and from the chamber 37 to the auxiliary reservoir 11. The separating piston 31 is realized in stepped fashion, with a piston section 35 of reduced diameter being connected to the atmosphere on the side of the chamber 38. This causes more pressure medium to be displaced out of the first chamber 37 than is supplied to the second chamber 38 when the separating piston 31 is displaced due to an actuation of the brake pedal 19. The larger the difference between the effective surfaces of chambers 37 and 38, the lower the main cylinder volume required for filling the auxiliary reservoir 11.

If the motor vehicle is, for example, driven on slippery ice, a few strokes of the brake pedal 19 suffice for charging the auxiliary reservoir 11 before the car is driven. Consequently, the volume of the auxiliary reservoir 11 can also be used for the slip control known from the state of the art. If a filled auxiliary reservoir 11 is not immediately required before the car is driven, said reservoir is automatically filled while driving due to pedal-actuated brake maneuvers.

In the brake system according to the invention, it is easily possible to realize the pump for the slip control in regenerative fashion because a suction connection with the main reservoir 2 is produced while the on-off valve 17 is open by way of the auxiliary reservoir 11, the reservoir charge line 30, the first chamber 37 as well as the supply line 34. As mentioned previously, the admission pressure return valve 29 prevents a negative pressure in the low-pressure reservoir 6. The separating valve 13 is always closed when used for the slip control. However, this separating valve can also be used in an antilock brake system without slip control if a smooth brake pedal is desired.

I claim:

1. Hydraulic brake system with slip control, comprising:

a pedal-actuated main cylinder, a main reservoir for supplying breaking fluid to said main cylinder, at least one wheel brake, a brake line that leads from the main cylinder to the wheel brake, a low-pressure reservoir, a return line that leads from the wheel brake to the low-pressure reservoir, a pump that is connected to the low-pressure reservoir with its suction side by way of a suction line and connected to the brake line with its pressure side by way of a pressure line, an inlet valve in the brake line, an outlet valve in the return line, an auxiliary reservoir that is connected to the suction line by way of a pump supply line that can be closed, a separating piston that separates a first and a second chamber wherein the first chamber is connected to the auxiliary reservoir, for charging said auxiliary reservoir, and the second chamber is connected to the main cylinder.

2. Brake system according to claim 1, wherein the connection between the first chamber and the auxiliary reservoir is formed by a reservoir supply line with a return valve that opens toward the auxiliary reservoir, and wherein the first chamber is connected to the main reservoir by a supply line with a return valve that opens toward the first chamber.

3. Brake system according to claim 1, wherein the separating piston is prestressed toward the second chamber by means of a spring.

4. Brake system according to claim 1, wherein said separating piston includes first and second working surfaces wherein said second working surface is less area than said first working surface and said second working surface defines a portion of said second chamber.

5. Brake system according to claim 1, wherein the auxiliary reservoir is used when the pressure in the brake line should be increased by way of the pump while the brake pedal is actuated.

* * * * *